(12) United States Patent
Waugh

(10) Patent No.: US 9,145,993 B1
(45) Date of Patent: Sep. 29, 2015

(54) NON-METALLIC FLUID COUPLING ASSEMBLIES

(71) Applicant: THE BOEING COMPANY, Seal Beach, CA (US)

(72) Inventor: Gregory M. Waugh, Renton, WA (US)

(73) Assignee: The Boeing Company, Chicago, IL (US)

( * ) Notice: Subject to any disclaimer, the term of this patent is extended or adjusted under 35 U.S.C. 154(b) by 163 days.

(21) Appl. No.: 13/657,062

(22) Filed: Oct. 22, 2012

(51) Int. Cl.
 *F16L 25/01* (2006.01)
(52) U.S. Cl.
 CPC ..................... *F16L 25/01* (2013.01)
(58) Field of Classification Search
 CPC .......... F16L 25/01; F16L 25/02; F16L 25/025
 USPC ......... 285/365, 366, 367, 411, 21.2; 361/215; 219/535, 524
 See application file for complete search history.

(56) References Cited

U.S. PATENT DOCUMENTS

| | | | | |
|---|---|---|---|---|
| 1,864,666 A * | 6/1932 | Osborne | ................. | 285/41 |
| 2,460,981 A * | 2/1949 | Francisco, Jr. et al. | ....... | 403/221 |
| 2,635,900 A | 4/1953 | Mayo et al. | | |
| 2,778,661 A * | 1/1957 | Leighton | ................. | 285/367 |
| 2,875,312 A * | 2/1959 | Norton | ................. | 219/535 |
| 2,883,211 A * | 4/1959 | Grass | ................. | 285/367 |
| 2,937,037 A * | 5/1960 | Woolsey | ................. | 285/367 |
| 3,006,663 A * | 10/1961 | Bowne | ................. | 285/367 |
| 3,298,698 A * | 1/1967 | Condon | ................. | 285/367 |
| 3,359,018 A * | 12/1967 | Simons | ................. | 285/367 |
| 3,776,579 A * | 12/1973 | Gale | ................. | 285/373 |
| 4,292,503 A * | 9/1981 | Brent | ................. | 219/535 |
| 4,303,457 A * | 12/1981 | Johansen et al. | ............ | 138/123 |
| 4,346,428 A * | 8/1982 | Gale | ................. | 361/215 |
| 4,417,755 A * | 11/1983 | Gittleman | ................. | 285/367 |
| 4,448,449 A | 5/1984 | Halling et al. | | |
| 4,496,176 A * | 1/1985 | Weinhold | ................. | 285/409 |
| 4,881,760 A * | 11/1989 | Runkles et al. | ............. | 285/373 |
| 4,900,070 A * | 2/1990 | Runkles et al. | ............. | 285/373 |
| 4,928,202 A * | 5/1990 | Gale et al. | ................. | 361/215 |
| 5,124,533 A * | 6/1992 | Dommer et al. | ............. | 219/524 |
| 5,131,689 A | 7/1992 | Bates | | |
| 5,620,210 A * | 4/1997 | Eyster et al. | .................. | 285/81 |
| 5,786,976 A * | 7/1998 | Field | ................. | 361/215 |
| 6,402,205 B1 * | 6/2002 | Rose et al. | ................. | 285/374 |
| 6,880,859 B2 | 4/2005 | Breay et al. | | |
| 7,144,047 B2 * | 12/2006 | Dole | ................. | 285/367 |
| 7,222,889 B2 | 5/2007 | Breay | | |

(Continued)

OTHER PUBLICATIONS

Flexible Couplings; http://www.in-flex.com/en/inflex-zodiac-flexible-d-flexible-couplings.html; In-Flex Aircraft Systems—Zodiac Aerospace; 2009; 4 pages.

(Continued)

*Primary Examiner* — David E Bochna
(74) *Attorney, Agent, or Firm* — Armstrong Teasdale LLP

(57) ABSTRACT

A non-metallic coupling for coupling a first fluid conduit to a second fluid conduit includes a sealing sleeve configured for a fluid tight sealing engagement of the first fluid conduit to the second fluid conduit. A coupling member is configured to apply a sealing force to the sealing sleeve. The coupling member includes a first portion and a second portion hingedly connected to the first portion. A latch is configured to lock the first portion to the second portion.

20 Claims, 4 Drawing Sheets

(56) References Cited

U.S. PATENT DOCUMENTS

| | | |
|---|---|---|
| 8,042,840 B2 | 10/2011 | Chahine et al. |
| 8,075,024 B2 | 12/2011 | Wern et al. |
| 2005/0023824 A1* | 2/2005 | Breay et al. .................. 285/363 |
| 2009/0096209 A1 | 4/2009 | Zilch |
| 2009/0322078 A1* | 12/2009 | Wern et al. .................. 285/413 |
| 2013/0327888 A1* | 12/2013 | Gaw et al. .................. 244/1 A |
| 2013/0328307 A1* | 12/2013 | Irwin et al. .................. 285/422 |

OTHER PUBLICATIONS

Coupling Assembly, Threadless, Flexible, Fixed Cavity, Current Carrying, Self-Bonding, Procurement Specification; http://standards.sae.org/as5830; 1 page; 2012.

* cited by examiner

NON-METALLIC FLUID COUPLING ASSEMBLIES

BACKGROUND

The field of the disclosure relates generally to couplings for fluid connections, and more particularly to non-metallic coupling assemblies for fluid connections.

Typically, fluid couplings for mechanical systems of vehicles, such as aircraft, are fabricated from metal or metal alloys. Such metallic parts are relatively heavy and may increase the likelihood of corrosion of other parts in contact with the metallic couplings, such as by bimetallic (i.e., galvanic) corrosion. Such metallic parts may also negatively impact a lighting protection and isolation scheme on an aircraft.

BRIEF DESCRIPTION

In one aspect, a non-metallic coupling for coupling a first fluid conduit to a second fluid conduit includes a sealing sleeve configured for a fluid tight sealing engagement of the first fluid conduit to the second fluid conduit. A coupling member is configured to apply a sealing force to the sealing sleeve. The coupling member includes a first portion and a second portion hingedly connected to the first portion. A latch is configured to lock the first portion to the second portion.

In another aspect, a fluid-tight coupling for connecting two or more conduits includes a flexible sealing sleeve having an inner diameter substantially equal to an outer diameter of the two or more conduits and a bifurcated coupling member. The bifurcated coupling member includes a non-metallic first half member and a non-metallic second half member coupled to the first half member at a first location by a hinge and a latch configured to releasably retain the first half member to the second half member at a second location. An inner diameter of the first half member and an inner diameter of the second half member are substantially equal to an outer diameter of the flexible sealing sleeve.

In yet another aspect, a fluid delivery system for an aircraft includes a first fluid conduit and a second fluid conduit configured to be in communication with a fluid source. A non-metallic coupling couples the first fluid conduit to the second fluid conduit. The non-metallic coupling includes a flexible sealing member configured for sealing contact between the first fluid conduit and the second fluid conduit and a hinged coupling member received over the flexible sealing member and configured to apply a force to the flexible sealing member. A latch is configured to releasably retain the hinged coupling member over the flexible sealing member.

DETAILED DESCRIPTION

Figure 1:
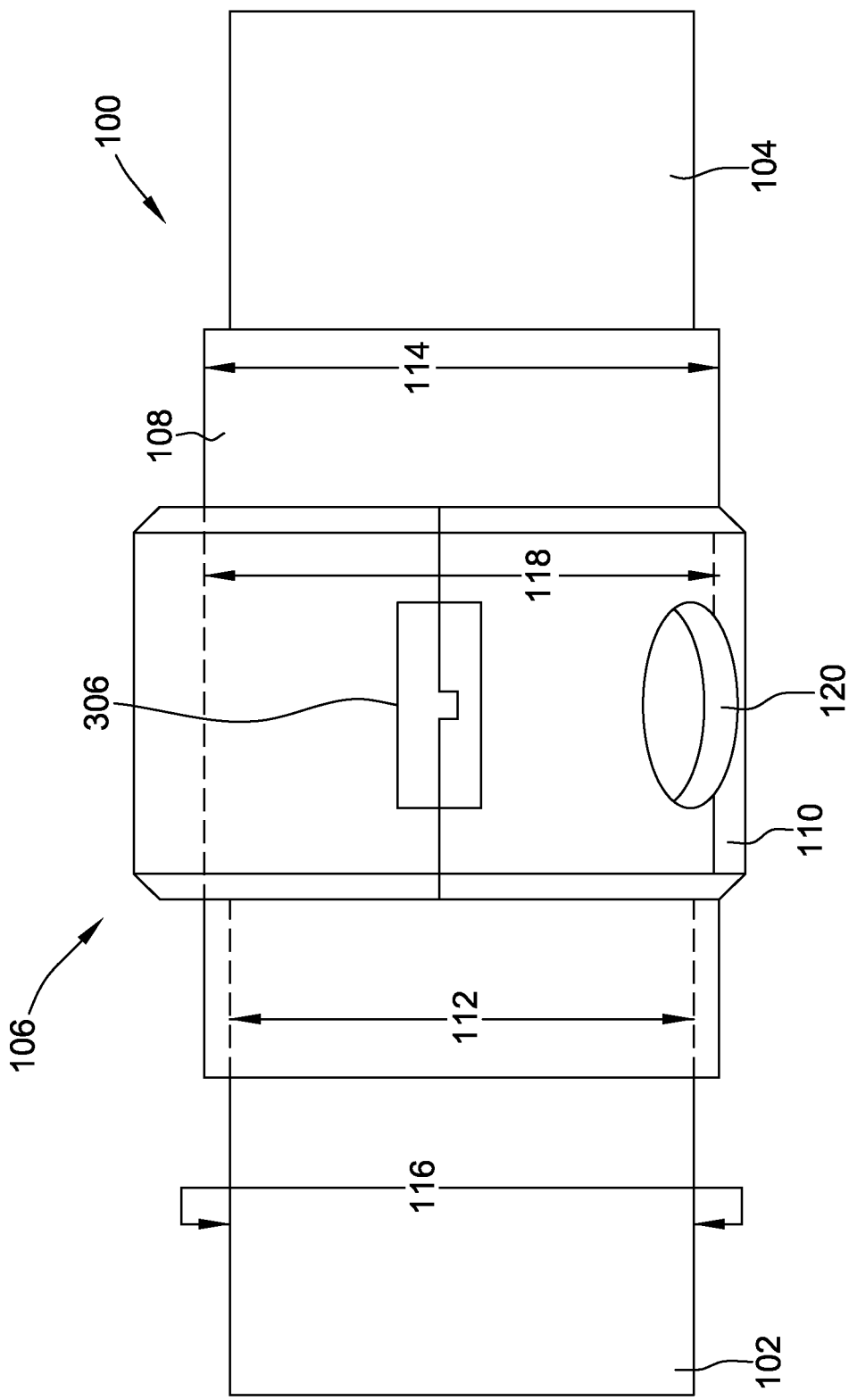
FIG. 1 is shows a fluid delivery system of an implementation.

Exemplary implementations of the disclosure are described herein with reference to the figures. Accordingly, unless otherwise indicated, like reference numerals refer to like components in the figures.

FIG. 1 shows generally a fluid delivery system 100 of an implementation. The exemplary implementation includes a first fluid delivery conduit 102, a second fluid delivery conduit 104 and a non-metallic coupling assembly 106. Fluid conduits 102 and 104 may be a tube, pipe, vessel and the like. Such fluid delivery system may be for vehicle fluid systems including, but not limited to fuel systems, cooling systems, pneumatic systems, electronics cooling systems and the like. In some implementations, the fluid delivery system is a fluid delivery system of an aircraft.

In one implementation, each of first fluid delivery conduit 102 and second fluid delivery conduit 104 are substantially cylindrical. In other implementations, fluid delivery conduits 102 and 104 may be any shape that allows the systems to function as described herein. Each of fluid delivery conduits 102 and 104 have an inside diameter 112 and an outside diameter 114 that is larger than the inside diameter. Fluid delivery conduits 102 and 104 are sized appropriately by one of ordinary skill depending upon the particular application for which the fluid delivery system is used. Fluid delivery conduits 102 and 104 are separate components and require coupling together in order to allow fluid to pass therethrough and maintain a seal against fluid leaks at the coupling. In order to couple first fluid conduit 102 to second fluid conduit 104, a coupling assembly 106 is provided.

Coupling assembly 106 includes a sealing member 108 and a coupling member 110. In one implementation, sealing member 108 is fabricated from a flexible material, such as rubber, plastic, polymers, textiles, resin impregnated fabrics and the like, which may be electrically insulative or isolative. In other implementations, flexibility to sealing member 108 may be imparted by way of the shape of sealing member 108, rather than material alone. In any instance, such flexibility is configured to allow at least some movement between fluid conduits 102 and 104. In some implementations, sealing member 108 is a sealing chamber with a piston seal or fay surface seal. Sealing member 108, also referred to herein as a sealing "sleeve," is configured to have an inner cross section shape, or diameter, that is complimentary to the outer cross sectional shape of fluid delivery conduits 102 and 104. For example, if fluid delivery conduits 102 and 104 are substantially cylindrical shapes (i.e., with a circular cross section), then the inner cross sectional shape of sealing member 108 has a circular cross sectional shape. However, conduits 102 and 104 and sealing member 108 may be any shape that allows the fluid coupling assemblies to function as described herein. The inner diameter 112 of the sealing member 108 is substantially the same as, or slightly larger than, the outer diameter 116 of fluid delivery conduits 102 and 104. As such, the inside surface of sealing member 108 fits tightly against the outside surface of fluid delivery conduits 102 and 104. In one implementation, sealing member 108 is configured to seal directly against fluid delivery conduits 102 and 104. In other implementations, one or more adhesives or sealants (not shown) may be applied between sealing member 108 and the outer surface of fluid delivery conduits 102 and 104.

Coupling member 110 is configured to receive sealing member 108 and fluid conduits 102 and 104 therein. In the exemplary implementation, the inner diameter 118 of coupling member 110 is sized such that it fits tightly against sealing member 108 when sealing member 108 is placed within coupling member 110. In some implementations, coupling member 110 includes one or more orifices 120 that provide viewing of the sealing member 108 therein, for inspection purposes, reduced weight and the like. In other implementations, coupling member 110 includes no orifices.

Figure 2:
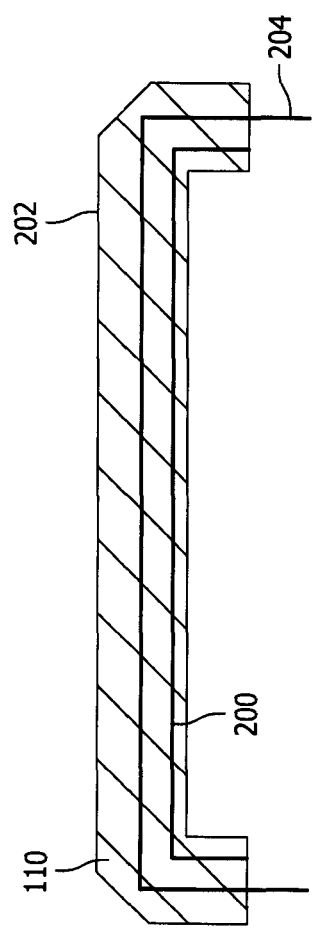
FIG. 2 is a section view of the exemplary coupling member shown in FIG. 1.
Figure 3:
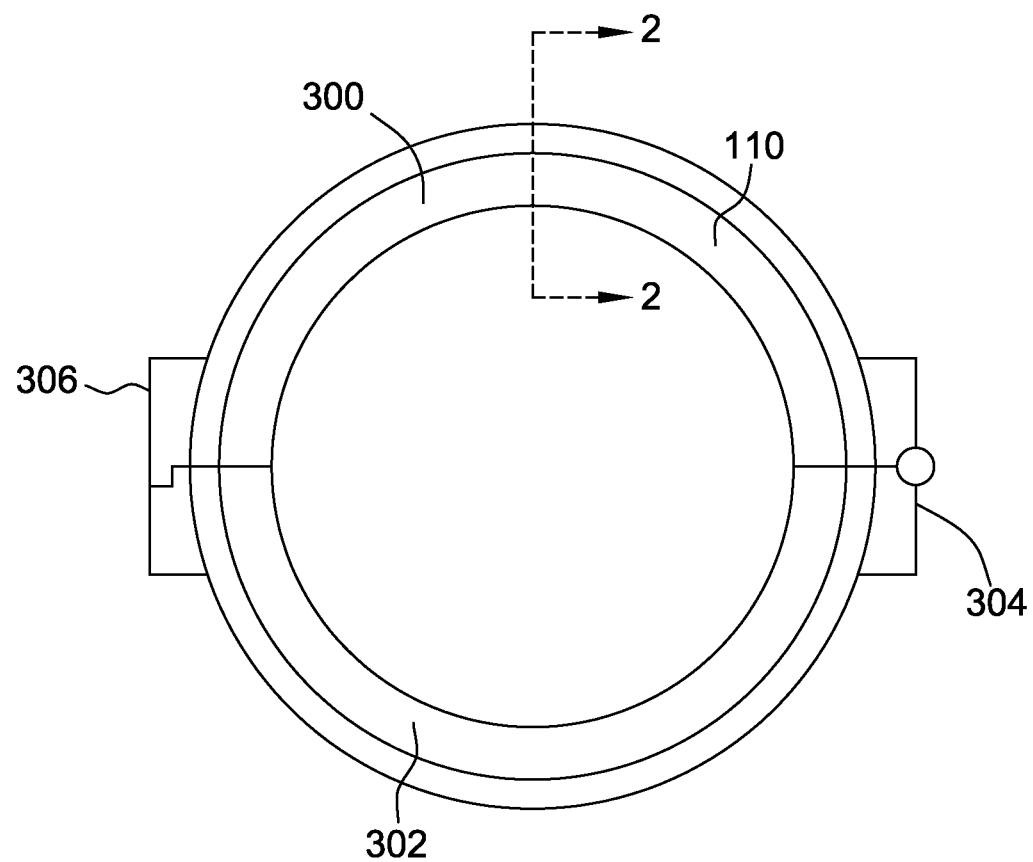
FIG. 3 is a side view of the exemplary coupling member shown in FIG. 1.

Reference is now made to FIGS. 2 and 3. Shown in FIG. 2 is a partial section view of coupling member 110 taken along section line 2-2 of FIG. 3. In the exemplary implementation, coupling member 110 has a C-shaped cross section, but may be any shape that allows the coupling member to function as described herein. In one implementation, coupling member 110 is fabricated from a non-metallic material, such as plastic, composites, polymers such as PEEK, fiberglass and the like or combinations thereof. Such non-metallic materials may be electrically conductive or insulative (i.e., having a high electrical resistance). In some implementations, at least a portion of coupling member 110 is fabricated from a non-metallic insulative material. In other implementations, at least a portion of coupling member 110 is fabricated from a conductive non-metallic material. In other implementations, the entire coupling member 110 is fabricated from an electrically insulative material. Coupling member 110 includes an inner surface 200 and an outer surface 202. In one implementation, coupling member 110 includes an electrically conductive member 204, also referred to as a "bonding member." The electrically conductive member 204 is fabricated from a material that is electrically conductive, such as carbon black, metal, metal alloys, a conductive non-metallic material and the like. In the exemplary implementation, electrically conductive member 204 is disposed between inner surface 200 and outer surface 202 of coupling member 110. However, in other implementations, electrically conductive member may also be disposed on outer surface 202 or inner surface 200. Electrically conductive member 204 may be configured to conduct electricity between fluid conduits 102 and 104 (shown in FIG. 1).

As shown in FIG. 3, coupling member 110 includes a first portion 300 and a second portion 302. First portion 300 is connected to second portion 302 via a hinge member 304. As such, coupling member 110 is bifurcated and may open and close like a "clam-shell." In one implementation, first portion 300 and second portion 302 are semi-circular in cross-sectional shape and each corresponds to substantially half of the coupling member 110. In other implementations, each of first portion 300 and second portion 302 are different sizes, such that the total cross section of both encompasses substantially 360 degrees (i.e., a complete perimeter without a substantial gap). Hinge member 304 may be a living hinge, barrel hinge and the like. Hinge member 304 may be formed integrally with one or more of first portion 300 and second portion 302, and in other implementations hinge member 304 may be separately formed and mechanically fastened to first portion 300 and second portion 302. A latch member 306 releasably retains first portion 300 and second portion 302 in a closed (i.e., clamped) state, for example as shown in FIG. 3. When in the closed state, coupling member 110 is configured to apply a radial force to sealing member 108 such that sealing member 108 seals against fluid conduits 102 and 104, thus creating a fluid tight seal. In one implementation, coupling assembly 100 is fluid-tight at a pressure up to 200 pounds per square inch, more particularly between about 25 to 175 psi, 50 psi to 150 psi, or 75 psi to 125 psi. For installation or disconnection purposes, latch 306 may be released to place first portion 300 and second portion 302 in an open state, such that little or no radial pressure is applied to sealing member 108. It is noted that latch 306 may be any retaining device that allows the fluid coupling assemblies to function as described herein. In one implementation, one or more of first portion 300 and second portion 302 are configured to receive an O-ring or piston seal (not shown) to provide additional sealing between fluid conduits 102 and 104.

Fabrication of one or more components of coupling assembly 100 may be by way of casting, forging, composite lay-up, resin transfer molding, stereo lithography and the like or combinations thereof. The materials described herein for fabrication of one or more components of coupling assembly 100 may be used for any of the components described herein. In one implementation, the components are fabricated such that the electrical conductivity of the sealing member 108 is different than the electrical conductivity of the coupling member 110. As the coupling assemblies are non-metallic or substantially non-metallic, lightweight assemblies may be fabricated that weigh up to 25% less than traditional coupling assemblies.

Figure 4:
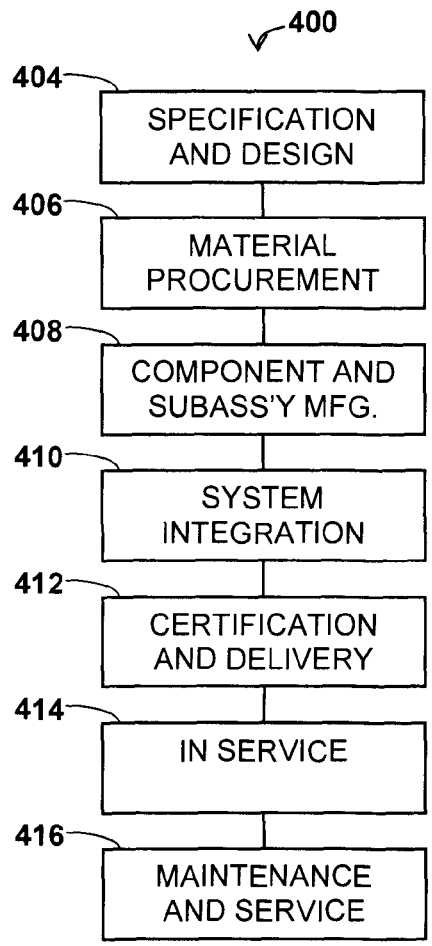
FIG. 4 is a flow diagram of aircraft production and service methodology.
Figure 5:
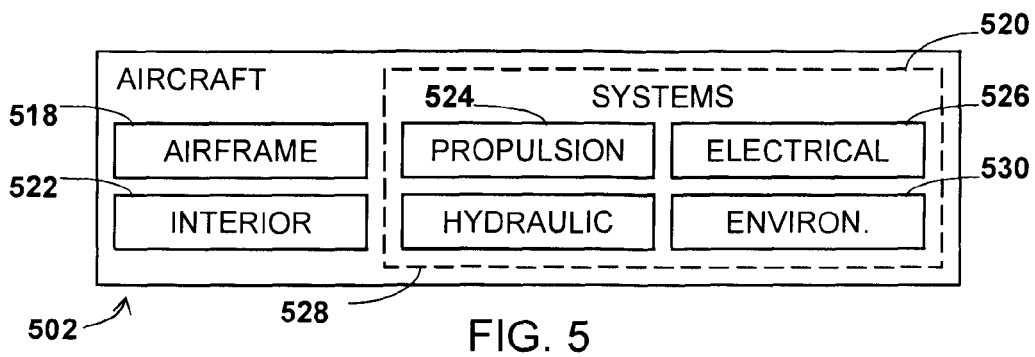
FIG. 5 is a block diagram of an aircraft.

With reference to FIGS. 4 and 5, implementations of this disclosure may be described in the context of an aircraft manufacturing and service method 400 as shown in FIG. 4 and an aircraft 502 as shown in FIG. 5. During pre-production, exemplary method 400 may include specification and design 404 of the aircraft 502 and material procurement 406. During production, component and subassembly manufacturing 408 and system integration 410 of the aircraft 502 takes place. Thereafter, the aircraft 502 may go through certification and delivery 412 in order to be placed in service 414. While in service by a customer, the aircraft 502 is scheduled for routine maintenance and service 416 (which may also include modification, reconfiguration, refurbishment, and so on).

Each of the processes of method 400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 5, the aircraft 502 produced by exemplary method 400 may include an airframe 518 with a plurality of systems 520 and an interior 522. Examples of high-level systems 520 include one or more of a propulsion system 524, an electrical system 526, a hydraulic system 526, and an environmental system 530. Any number of other systems may be included. Although an aerospace example is shown, the principles of the invention may be applied to other industries, such as the automotive industry.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 502 is in service. Also, one or more apparatus embodiments, method embodiments, or a combination thereof may be utilized during the production stages 408 and 410, for example, by substantially expediting assembly of or reducing the cost of an aircraft 502. Similarly, one or more of apparatus embodiments, method embodiments, or a combination thereof may be utilized while the aircraft 502 is in service, for example and without limitation, to maintenance and service 416.

Exemplary implementations of the coupling assembly are described above in detail. The coupling assembly and its components are not limited to the specific implementations described herein, but rather, components of the systems may be utilized independently and separately from other components described herein. For example, the components may also be used in combination with other fluid systems, methods, and apparatuses, and are not limited to practice with only the systems and apparatus as described herein. Rather, the exemplary implementations can be implemented and utilized in connection with many other applications.

Although specific features of various implementations of the disclosure may be shown in some drawings and not in others, this is for convenience only. In accordance with the principles of the disclosure, any feature of a drawing may be referenced and/or claimed in combination with any feature of any other drawing.

This written description uses examples to disclose various implementations, including the best mode, and also to enable any person skilled in the art to practice the aspects of the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A non-metallic coupling for coupling a first fluid conduit to a second fluid conduit, the non-metallic coupling comprising:
   a sealing sleeve configured for a fluid tight sealing engagement of the first fluid conduit to the second fluid conduit;
   a coupling member configured to apply a sealing force to the sealing sleeve, the coupling member comprising:
      a first portion and a second portion hingedly connected to the first portion, the first portion and the second portion each having an inner surface and an outer surface;
      a latch configured to lock the first portion to the second portion; and
      an electrically conductive member positioned between the inner surface and the outer surface such that the electrically conductive member is substantially embedded within at least one of the first portion and the second portion, the electrically conductive member configured to electrically couple the first fluid conduit to the second fluid conduit, wherein the electrically conductive member includes a first end and an opposing second end, the first end extending from one of the first portion and the second portion to contact the first fluid conduit, and the second end extending from one of the first portion and the second portion to contact the second fluid conduit.

2. The non-metallic coupling according to claim 1, wherein the coupling member has a substantially cylindrical shape.

3. The non-metallic coupling according to claim 2, wherein the first portion is substantially half of a cylinder and the second portion is substantially another half of the cylinder.

4. The non-metallic coupling according to claim 1, wherein at least one of the sleeve and the coupling member are fabricated from a plastic material.

5. The non-metallic coupling according to claim 1, wherein at least one of the sleeve and the coupling member are fabricated from a composite material.

6. The non-metallic coupling according to claim 1, wherein the electrically conductive member is fabricated from carbon black.

7. The non-metallic coupling according to claim 1, wherein the coupling member further comprises an electrically isolative member configured for electrical isolation between the first fluid conduit and the second fluid conduit.

8. The non-metallic coupling according to claim 1, wherein the coupling member is fabricated from an electrically insulative material.

9. The non-metallic coupling according to claim 1, wherein the electrical conductivity of the sealing sleeve is different than the electrical conductivity of the coupling member.

10. The non-metallic coupling according to claim 1, wherein the sealing sleeve is flexible.

11. The non-metallic coupling according to claim 1, wherein the sealing sleeve spans a joint formed between the first fluid conduit and the second fluid conduit.

12. The non-metallic coupling according to claim 1, wherein the sealing sleeve comprises a first axial length and the coupling member includes a second axial length that is shorter than the first axial length.

13. The non-metallic coupling according to claim 1, wherein the electrically conductive member is positioned circumferentially between the latch and the hinged connection of the first fluid conduit and the second fluid conduit.

14. A fluid-tight coupling for connecting two or more conduits, the fluid-tight coupling comprising:
   a flexible sealing sleeve having an inner diameter substantially equal to an outer diameter of the two or more conduits; and
   a bifurcated coupling member comprising:
      a non-metallic first half member and a non-metallic second half member coupled to the first half member at a first location by a hinge, the first half member and the second half member each having an inner surface and an outer surface;
      a latch configured to releasably retain the first half member to the second half member at a second location; and
      an electrically conductive member positioned between the inner surface and the outer surface such that the electrically conductive member is substantially embedded within at least one of the first half member and the second half member, the electrically conductive member configured to electrically couple the first fluid conduit to the second fluid conduit, wherein the electrically conductive member includes a first end and an opposing second end, the first end extending from one of the first portion and the second portion to contact the first fluid conduit, and the second end extending from one of the first portion and the second portion to contact the second fluid conduit;
   wherein an inner diameter of the first half member and an inner diameter of the second half member are substantially equal to an outer diameter of the flexible sealing sleeve.

15. The fluid-tight coupling according to claim 14, wherein the bifurcated coupling member is configured to apply a substantially radial pressure to the flexible sealing sleeve when the first half member is retained to the second half member.

16. The fluid-tight coupling according to claim 14, wherein the fluid-tight coupling is configured to be fluid-tight at a pressure up to 200 pounds per square inch.

17. The fluid-tight coupling according to claim 14, wherein the bifurcated coupling member is fabricated from at least one of a composite material, a polymer or a plastic.

18. A fluid delivery system for an aircraft, comprising:
   a first fluid conduit and a second fluid conduit configured to be in communication with a fluid source; and a non-metallic coupling for coupling the first fluid conduit to the second fluid conduit, the non-metallic coupling comprising:
  a flexible sealing member configured for sealing contact between the first fluid conduit and the second fluid conduit;
  a hinged coupling member received over the flexible sealing member and configured to apply a force to the flexible sealing member, the coupling member having an inner surface and an outer surface;
  a latch configured to releasably retain the hinged coupling member over the flexible sealing member; and
  an electrically conductive member positioned between the inner surface and the outer surface such that the electrically conductive member is substantially embedded within the coupling member, the electrically conductive member configured to electrically couple the first fluid conduit to the second fluid conduit, wherein the electrically conductive member includes a first end and an opposing second end, the first end extending from one of the first portion and the second portion to contact the first fluid conduit, and the second end extending from one of the first portion and the second portion to contact the second fluid conduit.

19. The fluid delivery system according to claim 18, wherein the non-metallic coupling is fabricated from an electrically non-conductive material.

20. The fluid delivery system according to claim 18, wherein the non-metallic coupling is fabricated from a composite material.

* * * * *